(12) United States Patent
Tanaka

(10) Patent No.: US 7,757,796 B2
(45) Date of Patent: Jul. 20, 2010

(54) ELECTRIC VEHICLE

(75) Inventor: Shigeyuki Tanaka, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 236 days.

(21) Appl. No.: 11/921,798

(22) PCT Filed: Jun. 27, 2006

(86) PCT No.: PCT/JP2006/313196
§ 371 (c)(1),
(2), (4) Date: Dec. 7, 2007

(87) PCT Pub. No.: WO2007/001079
PCT Pub. Date: Jan. 4, 2007

(65) Prior Publication Data
US 2009/0205887 A1   Aug. 20, 2009

(30) Foreign Application Priority Data
Jun. 29, 2005   (JP) .............................. 2005-189536

(51) Int. Cl.
B60K 1/00   (2006.01)
(52) U.S. Cl. .................................... 180/65.1; 180/65.8
(58) Field of Classification Search ................. 180/65.1, 180/65.24, 65.31, 65.285, 65.29; 903/906, 903/907, 930
See application file for complete search history.

(56) References Cited

U.S. PATENT DOCUMENTS

2003/0137275 A1 *   7/2003   Suzuki et al. ............... 320/104

FOREIGN PATENT DOCUMENTS

| JP | 60-39398 A | 3/1985 |
|----|---|---|
| JP | 06-225402 A | 8/1994 |
| JP | 7-99704 A | 4/1995 |
| JP | 2000-253512 A | 9/2000 |
| JP | 2003-32805 A | 1/2003 |
| JP | 2004-135371 A | 4/2004 |
| JP | 2004135371 A * | 4/2004 |
| JP | 2004-159401 A | 6/2004 |
| JP | 2004-175230 A | 6/2004 |

* cited by examiner

Primary Examiner—Paul N Dickson
Assistant Examiner—Bryan A Evans
(74) Attorney, Agent, or Firm—Kenyon & Kenyon LLP

(57) ABSTRACT

An electric vehicle comprises a drive shaft that outputs drive force and at least two electric motors that output power to this drive shaft, and further comprises control means that executes, when either of the electric motors is in non-drive condition, torque restriction of the electric motor in the drive condition based on the counter electromotive voltage of the electric motor in the non-drive condition. In an electric vehicle in which the same shaft is driven by two or more electric motors, circuit components such as inverters can be suitably protected even in the case where vehicle running is continued with one of the electric motors in non-drive condition.

5 Claims, 6 Drawing Sheets

ELECTRIC VEHICLE

This is a National Stage filing of International Application PCT/JP2006/313196 filed 27 Jun. 2006, which claims priority of Japanese Patent Application No. 2005-189536 filed 29 Jun. 2005, the contents of which are incorporated herein by reference.

BACKGROUND OF THE INVENTION

The present invention relates to an electric vehicle in which the same shaft is driven by two or more electric motors.

Electric vehicles are known in which the same shaft is driven by two or more motors. For example, Laid-open Japanese Patent Application No. 2004-135371 discloses an electric vehicle of a construction wherein the same shaft is driven by the drive sources of two independent systems, and a technique is disclosed whereby, if abnormality occurs with one of these systems, by regenerating part of the output of the normal drive source with the drive system in which the abnormality occurred, and supplying the regenerated power to an auxiliary machine of the system in which abnormality occurred, continued running can be achieved.

In this way, by providing two or more motors in the electric vehicle, even when abnormality occurs in one of the motors, running can be achieved using the other motor.

However, if the output shafts of the motors are engaged with the same drive shaft without interposition of a clutch, discontinuance of power supply causes a non-drive condition to be produced in respect of the motor where abnormality occurred, with the result that, if running is continued with the motor that is not abnormal, a counter electromotive voltage is generated in the motor in the non-drive condition due to the rotation of the drive shaft: there was therefore a risk of a fault being produced in a circuit component such as an inverter if the counter electromotive voltage produced by high-speed running should exceed the withstand voltage of this circuit component.

SUMMARY OF THE INVENTION

Accordingly, in an electric vehicle wherein the same shaft is driven by two or more electric motors, an object of the present invention is to provide a control technique whereby it is possible to suitably protect a circuit component such as an inverter in cases where running is continued with one electric motor in a non-drive condition.

In order to solve this problem, an electric vehicle according to the present invention, in an electric vehicle comprising a drive shaft that outputs drive force and at least two electric motors that output power to this drive shaft, is characterized by comprising control means that executes, when either electric motor is in a non-drive condition, torque restriction to the electric motor in a drive condition, based on a counter electromotive voltage of the electric motor in the non-drive condition.

Conveniently, a characteristic feature is that the control means, when abnormality is detected in an electric motor, electrically disconnects a power supply path to this electric motor, thereby putting this electric motor in a non-drive condition.

Conveniently also, a characteristic feature is that the control means, when there is an electric motor for which a torque restriction is executed, cancels the torque restriction under the condition that the vehicle is ascertained to have stopped.

Conveniently also, a characteristic feature is that the control means, when canceling a torque restriction executed to an electric motor, cancels the torque restriction by exercising control whereby the torque restriction value is raised in stages.

A control device according to the present invention is a control device for an electric vehicle comprising a drive shaft that outputs drive force and at least two electric motors that output power to this drive shaft, characterized in that, when one of the electric motors is in a non-drive condition, the control device executes torque restriction to the electric motor that is in drive condition based on a counter electromotive voltage of the electric motor that is in the non-drive condition.

DETAILED DESCRIPTION

Preferred embodiments of the present invention are described below with reference to the drawings.

Figure 1:
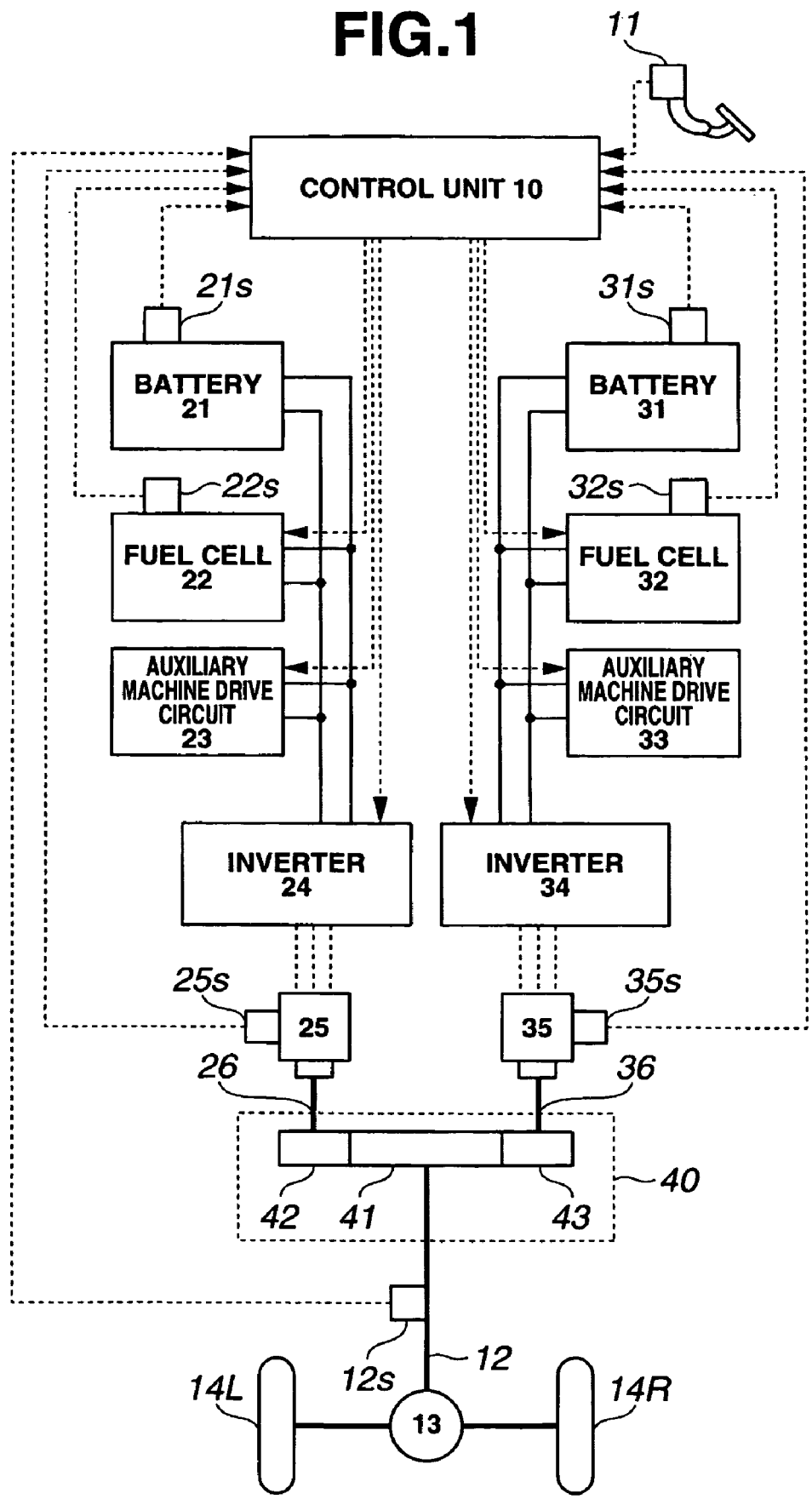
FIG. 1 is a diagram showing the diagrammatic layout of an electric vehicle according to this embodiment.

FIG. 1 is a diagram showing the diagrammatic layout of an electric vehicle according to this embodiment. This electric vehicle comprises two drive sources that output power and that are constituted as two independent systems, on the right side and the left side. The left side drive source comprises as the main power source a solid-state polymer type fuel cell 22 and as the auxiliary power source a battery 21. The power that is supplied from these power sources is converted to AC form by an inverter 24 constituting a drive circuit, and is supplied to an AC motor 25.

The right-hand side drive source also has the same construction. As the right-hand side drive source, there are provided a fuel cell 32, battery 31, inverter 34 and AC motor 35. In this embodiment, the output characteristics and capacity of the right-hand side drive source and the left-hand side drive source are the same. Also, fuel gas is respectively supplied from a common hydrogen tank (not shown) to the fuel cells 22, 32.

A rotary shaft 26 of the motor 25 and the rotary shaft 36 of the motor 35 are respectively connected with gears 42, 43 within the gearbox 40. The gears 42, 43 are spur gearwheels that mesh with a drive gear 41. The drive gear 41 is coupled with the drive shaft 12. The power of the motors 25, 35 is output to the drive shaft 12 through the gears of the gearbox 40 and is transmitted to the vehicle wheels 14L, 14R through a differential gear 13.

In this embodiment, auxiliary machine drive circuits 23, 33 for receiving power and driving various types of auxiliary machines are connected with the drive sources. The auxiliary machine drive circuits 23, 33 are respectively provided with for example a pump for supplying fuel gas or cooling water to the fuel cells 22, 32, an oil pump for power steering, an outlet for power supply to auxiliary electrical equipment in the vehicle, a compressor for cooling the battery 21, a compressor for air-conditioning, an electric heater for air conditioning, and an air compressor for braking, etc.

The various parts of the vehicle are controlled by means of a control unit 10. The control unit 10 is constituted as a microcomputer comprising in its interior a CPU, ROM and RAM, and that controls operation of the various sections of the vehicle in accordance with a control program stored in ROM. In particular, when either motor is in a non-drive condition, the control unit 10 of this embodiment is constructed so as to execute torque restriction of the motor that is in drive condition in accordance with the counter electromotive voltage of the motor that is in non-drive condition.

In the Figure, various types of signal lines that are connected with the control unit 10 for realizing control of the various sections are indicated by way of example by broken lines. The sensor signals that are input to the control unit 10 include for example an accelerator degree of opening sensor 11, vehicle speed sensor 12$s$, motor speed sensors 25$s$, 35$s$, abnormality detection sensors 22$s$, 32$s$ of the fuel cells 22, 32, and residual capacity sensors 21$s$, 31$s$ that detect the residual capacity (SOC) of the batteries 21, 31.

The output signals from the control unit 10 include for example the output control signals of the fuel cells 22, 32, the control signals of the auxiliary machine drive circuits 23, 33 and the control signals of the inverters 24, 34.

First Embodiment

Figure 2:
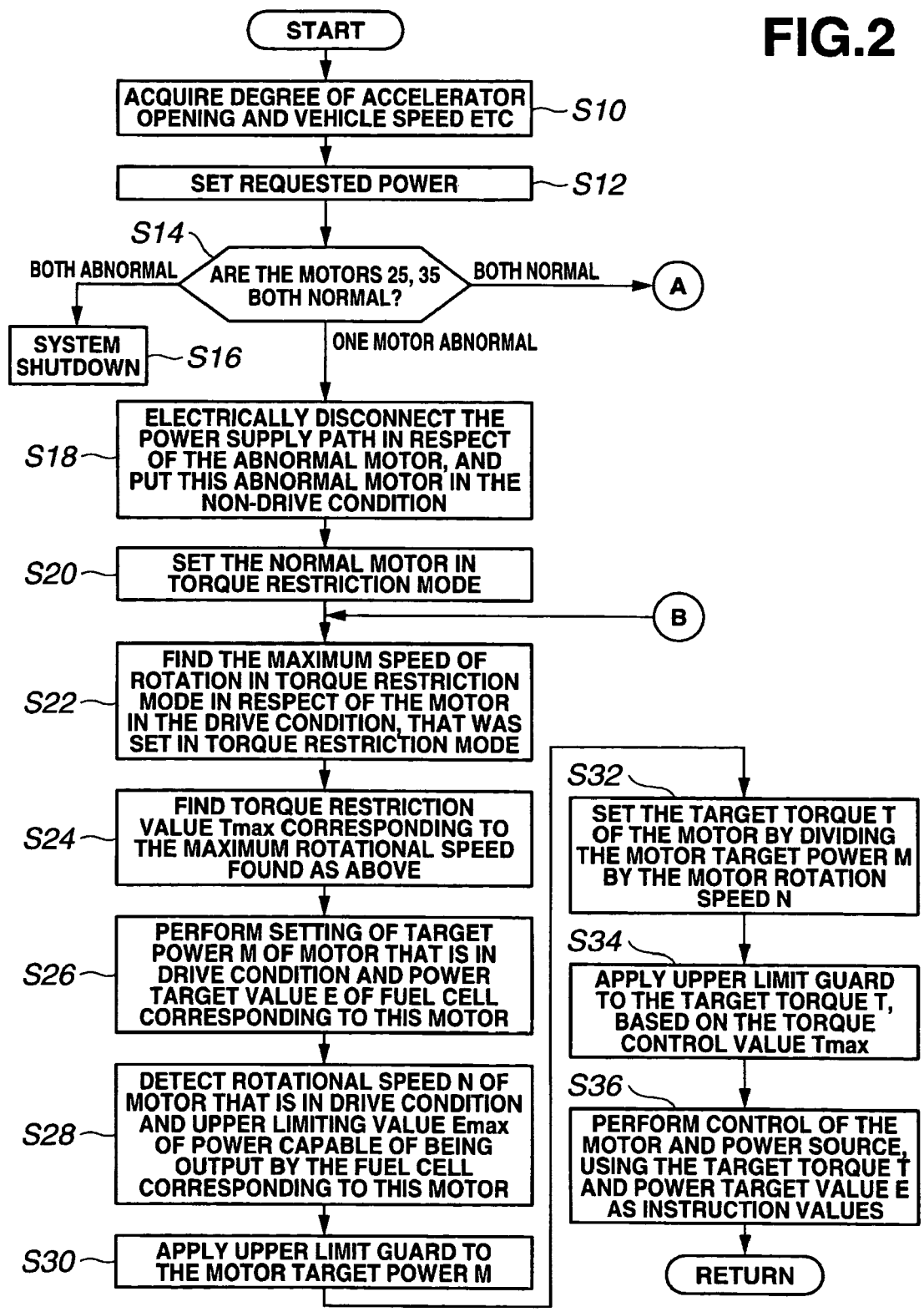
FIG. 2 is a flow chart of drive control processing according to a first embodiment.
Figure 3:
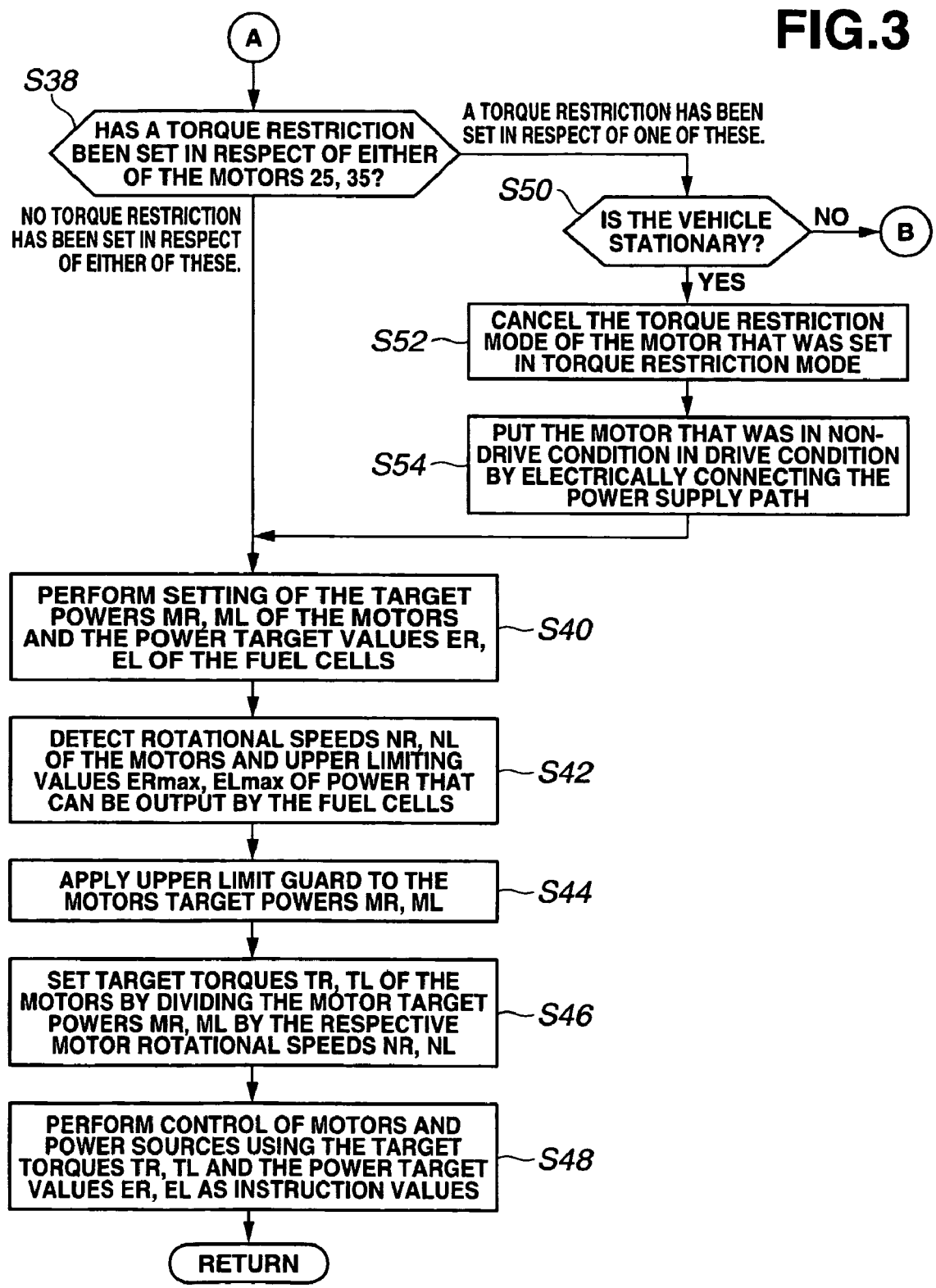
FIG. 3 is a flow chart of drive control processing according to a first embodiment.

FIG. 2 and FIG. 3 are flow charts of operation control processing according to the first embodiment. Operation control processing is repeatedly executed by the control unit 10 during running of the electric vehicle or while the electric vehicle is stationary. It should be noted that the various steps could be executed in any order or in parallel so far as is consistent with the content of the processing (including partial steps not indicated by reference symbols): this also applies in respect of the other embodiments.

First of all, the control unit 10 acquires (Step S10) for example the degree of accelerator opening and vehicle speed, as parameters used for control. In the variables of various type used in this control processing, R signifies values relating to the right-hand side system and L signifies values relating to the left-hand side system.

Next, the various types of requested power are set (Step S12) as indicated below by the control unit 10 in accordance with these parameters. The total requested power Ptr is the requested power for driving the vehicle, and is set by referring to a map specifying the total requested power Ptr beforehand in relation to the degree of accelerator opening and vehicle speed. The auxiliary machine powers PRa, PLa are the requested powers for driving the auxiliary machines and vary depending on the operating condition of the various auxiliary machines. The charging powers PRb, PLb are powers for charging the batteries 21, 31. In this embodiment, in order to commence charging if the residual capacity of the batteries 21, 31 is less than a pre-set lower limiting value, the charging powers PRb, PLb are determined in accordance with the residual capacity at that time point. If the residual capacity of the batteries 21, 31 is at least the lower limiting value, charging is not needed, so the charging powers PRb, PLb are 0.

Next, the control unit 10 decides whether or not the motors 25, 35 are normal (Step S14). The decision regarding normality/abnormality of the motors can be performed using prior art technology.

If the control unit 10 decides that both motors 25, 35 are abnormal (Step S14: both abnormal), it concludes that running of the vehicle cannot be continued, and performs system shutdown (Step S16). Concurrently, it may report to the driver that motors 25, 35 are abnormal.

On the other hand, if the control unit 10 concludes that only one or other of the motors 25, 35 is abnormal (Step S16: one motor abnormal), it electrically cuts off the power supply path in respect of the motor concluded to be abnormal (hereinbelow referred to as the "abnormal motor", putting it in non-drive condition (Step S18). For example, shutdown control of the inverter on the side of the abnormal motor may be executed to cut off electrical connection between the inverter and motor. It should be noted that, in this case also, abnormality of one of the motors 25, 35 may be reported to the driver in the same way.

Next, the control unit 10 sets torque restriction mode (Step S20) in respect of the motor that was concluded not to be abnormal (hereinbelow termed the "normal motor") while it maintains this motor in the drive condition. For example, a status flag indicating the torque restricted condition may be provided for each motor, and the status flag corresponding to the normal motor may be set to "torque restriction ON".

Next, the control unit 10 finds the maximum speed under torque restriction mode, using the following equation, in respect of the motor that is in drive condition and in respect of which torque restriction mode has been set (Step S22).

Maximum rotational speed=(withstand voltage of circuit component such as inverter of motor that is in non-drive condition)/(back constant of motor that is in non-drive condition)

In this way, the maximum speed of rotation in torque restriction mode can be found such that the counter electromotive voltage generated in the motor that is in non-drive condition produced by the rotation of the drive shaft 12 that is driven by the motor in drive condition does not exceed the withstand voltage of the circuit component such as an inverter of the motor that is in non-drive condition. It should be noted that the back constant of the motor in the equation can be found for example by referring to a map determining the relationship between the temperature and the back constant, and applying the motor temperature when processing is executed.

Next, by referring to a map determining the relationship between the maximum speed of rotation in torque restriction mode and the torque restriction value, the control unit 10 finds the torque restriction value Tmax (Step S24) corresponding to the maximum rotational speed found as described above.

Next, the control unit 10 performs setting (Step S26) of the target power M of the motor that is in drive condition and the power target value E of the fuel cell corresponding to this motor. These target values may be set for example as follows.

Power target value:

$E=Ptr+PRa+PRb+PLa+PLb;$

Motor target power:

$M=Ptr.$

Next, the control unit 10 detects (Step S28) the rotational speed N of the motor that is in drive condition and the upper limiting value Emax of the power that can be output by the fuel cell corresponding to this motor, as parameters for controlling the operation of the motor and the fuel cell. It should be noted that, if the motor rotational speed N exceeds the maximum rotation speed found in Step S24, control can be performed such as to lower the rotational speed by performing motor regeneration by setting the motor target power to negative.

Next, the control unit 10 applies an upper limit guard (Step S30) to the motor target power M by calculation in accordance with the following equation. It should be noted that MIN in the following equation is an operator signifying that the minimum value of two values is selected.

Motor target power M=MIN (motor target power M, maximum value Emax of power that can be output)

In this way, the motor is driven within the power range that can be supplied from the fuel cell.

Next, the control unit 10 sets (Step S32) the target torque T of the motor by dividing the motor target power M by the motor rotational speed N.

Next, the control unit 10 applies (Step S34) an upper limit guard to the target torque T based on the torque restriction value Tmax, by the calculation of the following equation.

Target torque T=MIN (target torque T, torque restriction value Tmax)

In this way, the target torque T is set such that the counter electromotive voltage generated in the motor which is in the non-drive condition by rotation of the drive shaft 12 driven by the motor that is in the drive condition is not made to exceed the withstand voltage of a circuit component such as an inverter of the motor that is in the non-drive condition.

Next, the control unit 10 performs control of the motor and the power source (Step S36) using the target torque T and power target value E as instruction values.

On the other hand, if the control unit 10 concludes that both motors 25, 35 are normal (Step S14: both normal), the control unit 10 then proceeds to ascertain (Step S38) whether or not either of the motors 25, 35 has been set in torque restriction mode, by for example referring to the status flag. If it then finds that neither of the motors has been set in torque restriction mode, the control unit then advances to Step S40 to perform control under normal conditions: however, if it finds that torque restriction mode has been set for either of the motors, it advances to Step S50.

In Step S40, the control unit 10 effects setting (Step S40) of target powers MR, ML of the motors 25, 35 and the power target values ER, EL of the fuel cells 22, 32. These target values may be set for example as follows.

Power target values:

ER=Ptr/2+PRa+PRb

EL=Ptr/2+PLa+PLb

Motor target powers:

MR=Ptr/2

ML=Ptr/2

Next, the control unit 10 detects (Step S42) the rotational speeds NR, NL of the motors and the upper limiting values ERmax, ELmax of the power capable of being output by the fuel cells as parameters for controlling the operation of the motors 25, 35 and fuel cells 22, 32.

Next, the control unit 10 applies an upper limit guard (Step S44) in respect of the motor target powers MR, ML by calculation of the following equations.

MR=MIN (MR, ERmax)

ML=MIN (ML, ELmax)

Next, the control unit 10 sets (Step S46) the target torques TR, TL of the motors by dividing the target powers MR, ML by the respective motor rotational speeds NR, NL.

Next the control unit 10 performs control of the power sources and motors (Step S48) using these target torques TR, TL and power target values ER, EL as instruction values.

If, on the other hand, in Step S38, it is concluded that torque restriction mode has been set in respect of one or other of the motors 25, 35, the control unit 10 ascertains (Step S50) whether or not the vehicle is in a stationary condition. For example, it may be concluded that the vehicle is stationary if a condition in which the degree of accelerator opening is no more than a prescribed value, brake depression is detected and the vehicle speed is no more than a prescribed value continues for at least a fixed time.

If the control unit 10 concludes that the vehicle is not in a stationary condition, the control unit 10 continues torque restriction respect of the motor that is in drive condition and power disconnection to the motor that is in the non-drive condition, and advances to Step S22.

On the other hand, if the control unit 10 concludes that the vehicle is in a stationary condition, the control unit 10 for example sets "torque restriction OFF" in the status flag in respect of the motor in respect of which torque restriction mode was set, thereby canceling the torque restriction mode (Step S52).

If the vehicle is running in torque restriction mode, even if the accelerator is pressed, the speed is not increased as it would be under normal running, so there is a possibility that the driver might depress the accelerator by an amount close to 100%. Consequently, if the torque restriction were to be cancelled in such a condition, the vehicle would suddenly accelerate, with a risk that the driver would experience the feeling of the vehicle dashing out. Accordingly, in this embodiment, a construction is adopted such that the torque restriction is only cancelled on condition that the vehicle is in a stationary condition as described above: the feeling of the vehicle dashing out on cancellation of torque restriction can thereby be prevented.

Next, the control unit 10 electrically connects the power supply path in respect of the motor that is in non-drive condition, putting this motor in the drive condition (Step S54). The control unit then advances to Step S40 to perform control under normal conditions.

With the construction as described above, in an electric vehicle wherein the same shaft is driven by two motors, when one motor is in a non-drive condition and vehicle running is continued by the other motor, which is in drive condition, torque restriction of the motor which is in drive condition is executed based on the a counter electromotive voltage of the motor which is in non-drive condition, so control can be performed such that the counter electromotive voltage that is generated in the motor which is in non-drive condition by the rotation of the drive shaft 12 that is driven by the motor that is in the drive condition is not made to exceed the withstand voltage of a circuit component such as an inverter of the motor that is in the non-drive condition: circuit components such as an inverter can thereby be suitably protected.

Also, if torque restriction mode is set in respect of either of the motors, a construction is adopted whereby the torque restriction mode is cancelled only when it is ascertained that the vehicle is stationary, so the situation that the vehicle suddenly accelerates due to cancellation of the torque restriction can be prevented.

Second Embodiment

Figure 4:
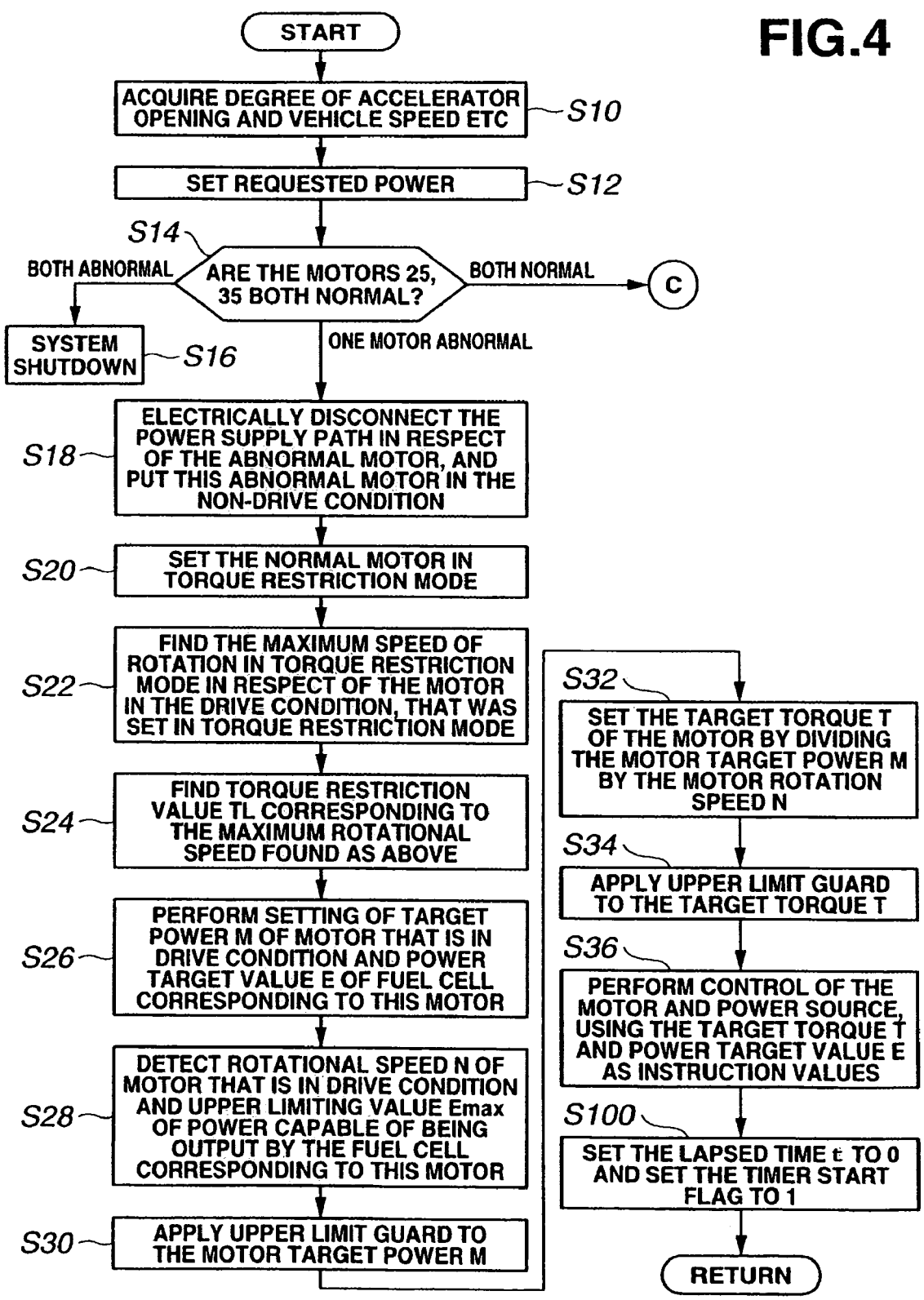
FIG. 4 is a flow chart of drive control processing according to a second embodiment.
Figure 5:
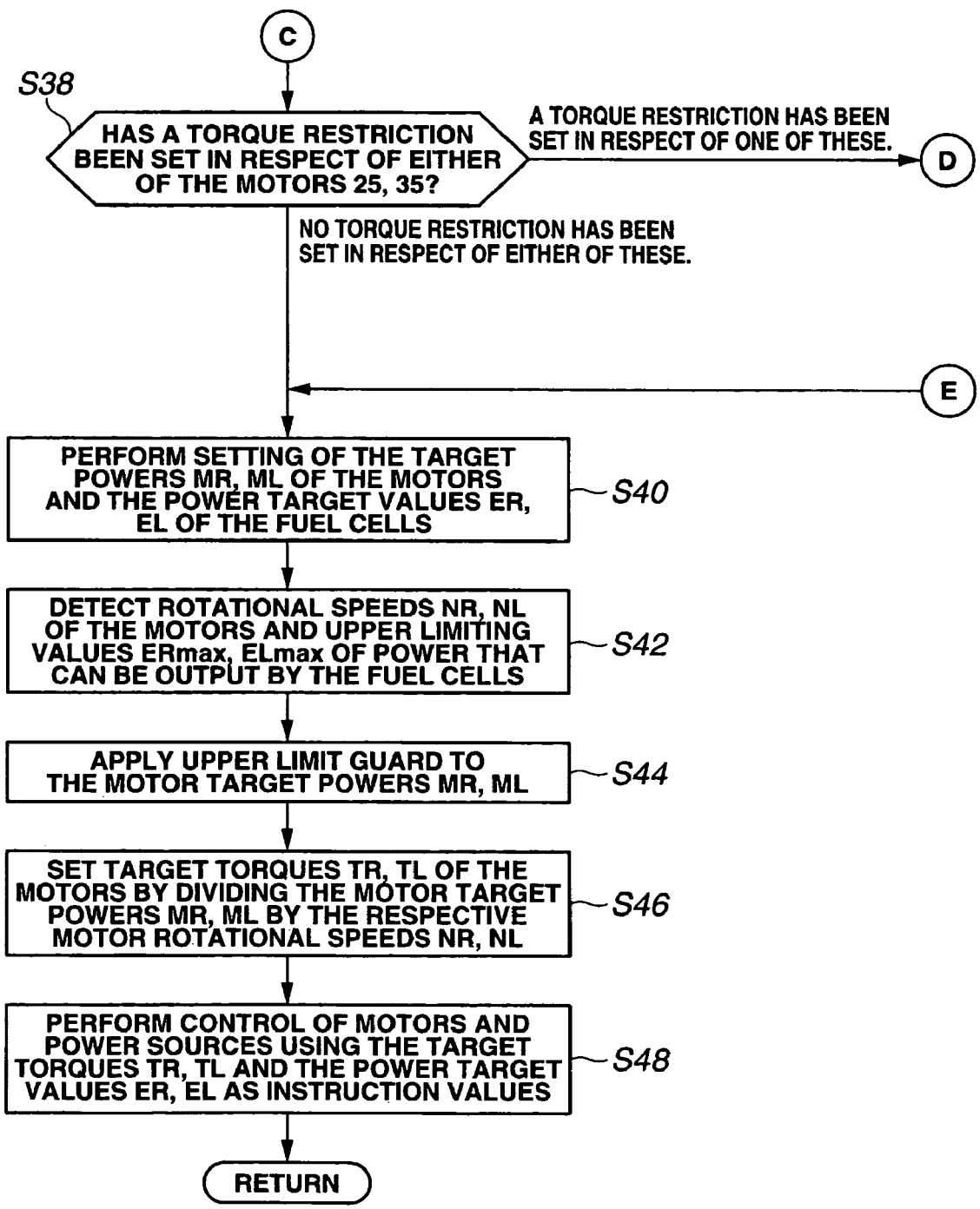
FIG. 5 is a flow chart of drive control processing according to a second embodiment.
Figure 6:
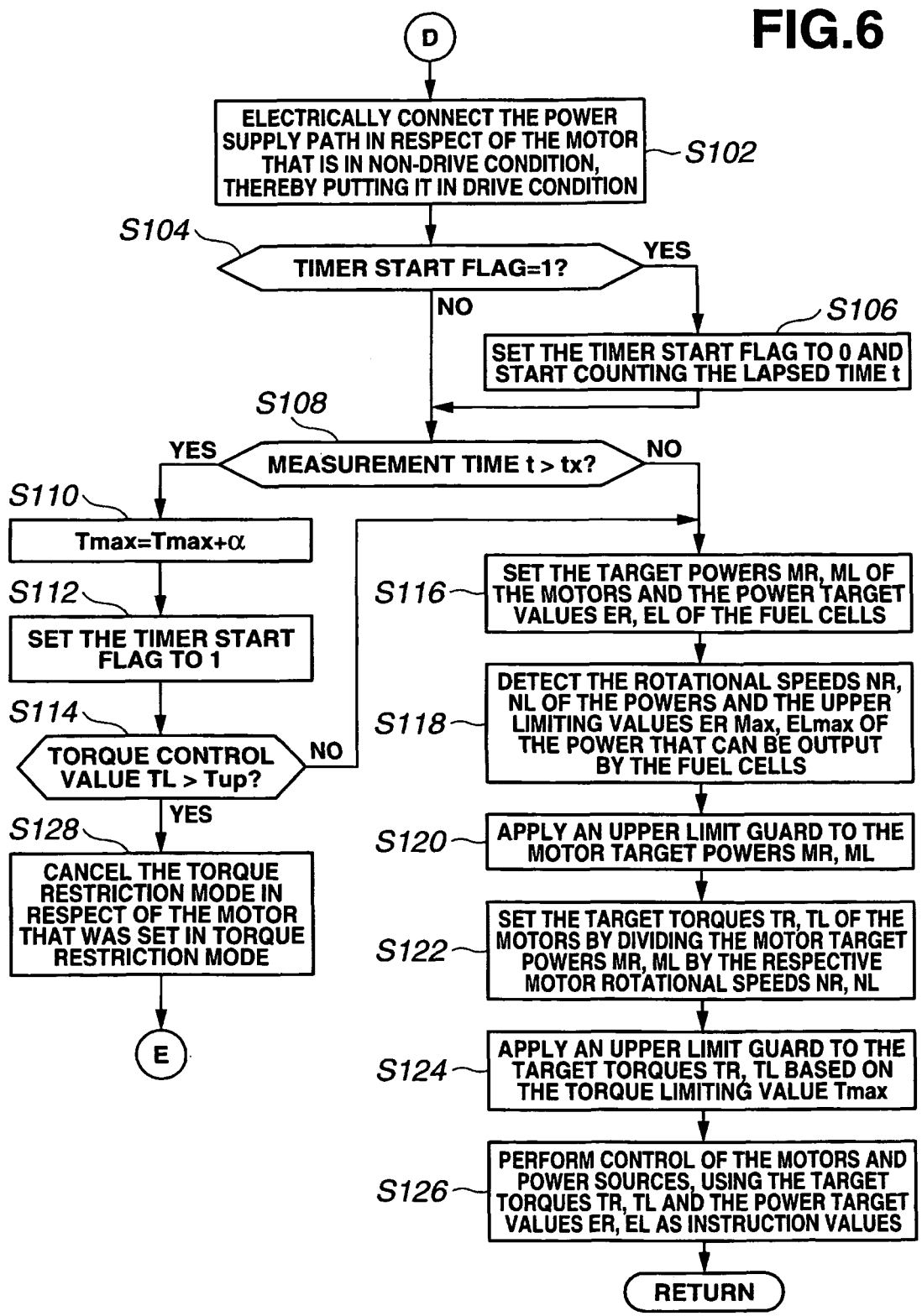
FIG. 6 is a flow chart of drive control processing according to a second embodiment.

FIG. 4 and FIG. 5 are flow charts of operating control processing according to a second embodiment.

The second embodiment differs from the first embodiment in that a construction is adopted wherein control is performed such that the torque restriction value is raised in stages when the torque restriction is cancelled.

Step S10 to Step S48 are the same as in the case of the first embodiment.

However, the control unit 10, during Step S20 to Step S36 (after Step S36 in FIG. 3) sets the lapsed time t to 0 and sets the timer start flag to 1 (Step S100).

On the other hand, if the control unit 10 finds that torque restriction mode is set in respect of either of the motors 25 or 35 in Step S38, the control unit 10 electrically connects the power supply in respect of the motor that is in non-drive condition, putting this motor in drive condition (Step 102).

Next, if the timer start flag is 1 (S104: Yes), the control unit 10 sets this timer start flag to 0 and starts to count the lapsed time t, using for example an internal timer (Step S106)

Next, the control unit 10 ascertains whether the elapsed time t has exceeded a prescribed time tx (Step S108) and, if this lapsed time has not been exceeded, advances to Step S116.

On the other hand, if the prescribed time tx has been exceeded, the control unit 10 updates the torque restriction value Tmax (Step S110) for example in accordance with the equation Tmax=Tmax+α, and sets 1 in the timer start flag (Step S112). α may be a prescribed constant (for example a constant corresponding to 5% of the torque of the limiting value Tup of a normal motor).

Next, the control unit 10 ascertains (Step S114) whether or not the torque restriction value Tmax exceeds the torque upper limiting value Tup, and if it finds that this is not exceeded, advances to Step S116.

In Step S116, the control unit 10 performs setting (Step S116) of the target powers MR, ML of the motors 25, 35 and the power target values ER, EL of the fuel cells 22, 32. These target values may be set for example as indicated below.

Power target value $$ER=Ptr/2+PRa+PRb$$

$$EL=Ptr/2+PLa+PLb$$

Motor target power $$MR=Ptr/2$$

$$ML=Ptr/2$$

Next, the control unit 10 detects (Step S118) the rotational speeds NR, NL of the motors and the upper limiting values ERmax, ELmax of the power that can be output by the fuel cells, as parameters for controlling the operation of the motors 25, 35 and the fuel cells 22, 32.

Next, the control unit 10 applies an upper limit guard (Step S120) to the motor target powers MR, ML by calculation in accordance with the following equations.

$$MR=MIN\ (MR, ERmax)$$

$$ML=MIN\ (ML, ELmax)$$

Next, the control unit 10 sets (Step S122) the target torques TR, TL of the motors by dividing the target powers MR, ML by the respective motor rotational speeds NR, NL.

Next the control unit 10 applies an upper limit guard (Step S124) to the target torques TR, TL in accordance with the torque restriction value Tmax by calculation in accordance with the following equations.

Target torque TR=MIN (target torque TR, torque restriction value Tmax/2)

Target torque TL=MIN (target torque TL, torque restriction value Tmax/2).

In this way, the torque that is generated by the motors 25, 35 is suppressed to within the range of the torque restriction value Tmax.

Next, the control unit 10 performs control (Step S126) of the power sources and motors using the target torques TR, TL and the power target values ER, EL as instruction values.

On the other hand, in Step S114, if it is concluded that the torque upper limiting value is exceeded, in respect of the motor in respect of which torque restriction mode was set, the control unit 10 for example cancels (Step S128) the torque restriction mode by setting the status flag to "torque restriction OFF", and advances to Step S40 to perform control under normal conditions.

With this construction, just as in the case of the first embodiment, control can be performed such that the counter electromotive voltage that is generated in the motor that is in the non-drive condition by rotation of the drive shaft 12 driven by the motor that is in the drive condition does not exceed the withstand voltage of a circuit component such as an inverter of the motor that is in the non-drive condition, and circuit components such as inverters can thereby be suitably protected.

Also, when torque restriction is cancelled that is executed in respect of either of the motors, cancellation is effected while exercising control such that the torque restriction value Tmax is raised in stages each of a prescribed time tx, so it is possible to prevent the situation that cancellation of the torque restriction causes sudden acceleration of the vehicle. Also, if the driver steps on the accelerator causing the vehicle to run in a condition with the torque raised to the torque limiting value, it is possible to effectively call the driver's attention to the cancellation of torque restriction by causing the driver to sense the progressive cancellation of the torque restriction.

Modified Example

The present invention is not restricted to the embodiment described above and can be suitably modified in various ways. For example, processing by the control unit 10 can be implemented by software or can be implemented by hardware.

Also, for example, although, in the embodiments described above, a construction was adopted in which the motor drive/non-drive condition was changed over depending on whether the motor was normal or not, instead of or in addition to such a construction, it would be possible to adopt a construction in which the motor drive/non-drive condition is changed over depending on whether another power source unit (such as for example a fuel cell) is normal or not.

Also, for example in the second embodiment, although a construction was adopted in which, when the torque restriction executed in respect of either motor was cancelled, cancellation was effected by performing control such that the torque restriction value was raised in stages, instead of or in addition to such a construction, it would be possible to arrange for the situation that the vehicle undergoes sudden acceleration to be prevented by raising the response characteristic progressively by changing the primary delay constant of the torque control system in stages.

Also, for example, in the above embodiments, a construction was adopted in which a plurality of motors were arranged to drive the same shaft, but it would also be possible to adopt a construction in which the motors drive respectively different drive shafts (for example, a construction in which motor 1 drives the front wheels while motor 2 drives the back wheels).

According to the present invention, in an electric vehicle wherein the same shaft is driven by two or more motors, components such as inverters can be suitably protected when continuing vehicle running with one motor in non-drive condition.

I claim:

1. An electric vehicle, comprising:
   a drive shaft that outputs drive force and at least two electric motors that output power to this drive shaft, each motor being operable in drive and non-drive conditions,
   said vehicle further comprising:
   a control device that executes, when one of the at least two electric motors is in the non-drive condition, torque restriction which limits the maximum rotational speed of another of the at least two electric motors that is in the drive condition, based on a counter electromotive voltage of the electric motor in the non-drive condition.

2. The electric vehicle according to claim 1, wherein the control device, when abnormality is detected in an electric motor, electrically disconnects a power supply path to the electric motor, thereby putting the electric motor in a non-drive condition.

3. The electric vehicle according to claim 1, wherein the control device, when there is an electric motor for which a torque restriction is executed, cancels the torque restriction under the condition that the vehicle is ascertained to have stopped.

4. The electric vehicle according to claim 1, the control device, when canceling a torque restriction executed to an electric motor, cancels the torque restriction by exercising control whereby the torque restriction value is raised in stages.

5. A control device for an electric vehicle, comprising:
   a drive shaft that outputs drive force and at least two electric motors that output power to this drive shaft, each motor being operable in drive and non-drive conditions,
   wherein, when one of the at least two electric motors is in a non-drive condition, the control device executes torque restriction which limits the maximum rotational speed of another of the at least two electric motors that is in the drive condition based on a counter electromotive voltage of the electric motor that is in the non-drive condition.

* * * * *